United States Patent [19]

Phalangas

[11] 4,066,524
[45] Jan. 3, 1978

[54] IMIDAZOLE POLYMERS AND PREPARATION THEREOF WITH RADIATION AND CHEMICAL INITIATOR

[75] Inventor: Charalambos J. Phalangas, Princeton Junction, N.J.

[73] Assignee: Hercules Incorporated, Wilmington, Del.

[21] Appl. No.: 605,799

[22] Filed: Aug. 18, 1975

Related U.S. Application Data

[63] Continuation of Ser. No. 357,357, May 4, 1973, abandoned.

[51] Int. Cl.$^2$ .......................... C08F 2/46; C08F 4/04; C08F 4/34
[52] U.S. Cl. .......................... 204/159.23; 204/159.24; 260/29.6 TA; 260/29.6 H; 526/263
[58] Field of Search ............. 204/159.22, 159.23, 204/159.24; 526/263; 260/29.6 TA, 29.6 H

[56] References Cited

U.S. PATENT DOCUMENTS

| | | | |
|---|---|---|---|
| 2,666,025 | 1/1954 | Nozaki | 204/159.24 |
| 2,891,025 | 6/1959 | Price | 204/159.23 |
| 3,001,922 | 9/1961 | Zimm | 204/159.22 |
| 3,036,086 | 5/1962 | Adicoff | 204/159.23 |
| 3,114,419 | 12/1963 | Perry et al. | 204/159.23 |
| 3,912,607 | 10/1975 | Communal et al. | 204/159.23 |
| 3,926,756 | 12/1975 | Restaino | 204/159.22 |

*Primary Examiner*—Murray Tillman
*Assistant Examiner*—Thurman K. Page
*Attorney, Agent, or Firm*—Michael B. Keehan

[57] ABSTRACT

Improved process for the preparation of water-soluble, high molecular weight imidazole polymers comprising irradiating an aqueous solution of an imidazole monomer and a chemical, free-radical initiator under conditions to cause radiation-induced polymerization of the monomer, terminating radiation of the system when less than all the monomer has been converted to polymer and when the temperature of the system is such that the chemical, free-radical initiator dissociates with the proper rate to sustain polymerization, and continuing the polymerization to completion by the free radicals generated by the thermal decomposition of the chemical initiator. The radiation-induced polymerization is terminated before more than 95% of the monomer is converted to polymer and preferably before 90% of the monomer is converted to polymer. The remaining monomer is converted to polymer by the free radicals generated by the thermal decomposition of the chemical initiator. Reaction conditions include: monomer concentrations from 15% to 90% by weight, radiation intensities of 10,000 to 1,000,000 rads per hour, and radiation dose from 5,000 to 500,000 rads.

11 Claims, No Drawings

IMIDAZOLE POLYMERS AND PREPARATION THEREOF WITH RADIATION AND CHEMICAL INITIATOR

This is a continuation of application Ser. No. 357,357, filed May 4, 1973.

This invention relates to water-soluble, high molecular weight imidazole polymers and to a process for the preparation thereof. More particularly, this invention relates to a process for obtaining water-soluble, high molecular weight imidazole polymers in substantially 100% yields by a process utilizing irradiation-induced polymerization and chemically initiated polymerization.

In recent years, attention has been focused on the polymerization of ethylenically unsaturated monomers under the influence of high energy ionizing radiation, for example, gamma radiation. Numerous processes have been developed for the preparation of water-soluble, substantially linear, ultra-high molecular weight polymers of ethylenically unsaturated monomers. One disadvantage of these radiation-induced polymerization processes, however, has been that at the higher monomer concentrations and lower radiation intensity required to produce the high molecular weight polymers, the polymerization process must be terminated before all the monomer has been converted to polymer in order to avoid undesirable amounts of branching and cross-linking of the polymer chains which results in the formation of water-insoluble polymers. This branching and cross-linking of the polymer to form water-insoluble products occurs because the number of free radicals formed directly or indirectly by irradiation on the polymer molecules increases as the polymer concentration in the irradiated solution increases, and therefore, the probability of two of these polymer radicals finding each other in close proximity to react and form linkages between the polymer molecules is greater, and because the rate of polymerization decreases as the monomer to polymer conversion increases, and therefore the radiation dose required per unit of percent conversion increases. In most cases the radiation dose required to convert the last few percentage points of monomer to polymer is a significant portion of the total radiation dose. Such a big radiation dose delivered to the polymerization system at the time when the polymer concentration is high will cross-link the polymer and result in the formation of water-insoluble products. Therefore, if radiation alone is used for the synthesis of very high molecular weight, water-soluble polymers from concentrated aqueous solutions, the polymerization reaction must be stopped short of complete conversion if cross-linking and insolubilization of the polymer is to be avoided.

It is also known in the prior art to irradiate an aqueous solution of monomer and chemical, free-radical initiator so that radiation-induced polymerization and chemical initiator-induced polymerization occur simultaneously. For the reasons given above, continuation of these reactions until complete conversion of monomer to polymer is obtained, will result in highly branched, cross-linked, water-insoluble products or in low intrinsic viscosity products. See, in connection with the polymerization of ethylenically unsaturated monomers using a combination of radiation and chemical, free-radical initiators, the discussion in U.S. Pat. Nos. 2,891,025; 3,036,086; 3,114,419; and 3,001,922.

In accordance with the present invention it has been found that very high molecular weight, water-soluble imidazole polymers may be prepared at conversion of monomer to polymer levels of up to substantially 100% by a process which comprises irradiating an aqueous solution containing an ethylenically unsaturated imidazole monomer and containing a small amount of a chemical, free-radical initiator wherein the radiation-induced polymerization is terminated before all the monomer is converted to polymer and the polymerization is continued to completion exclusively by the free radicals generated by the thermal decomposition of the chemical, free-radical initiator present in the system. As more fully set forth hereinafter, the chemical, free-radical initiator and the conditions of the radiation-induced polymerization are chosen so that at the time the irradiation is stopped the temperature of the system is such that the initiator dissociates with the proper rate to sustain the polymerization to carry it to almost theoretical completion within a reasonable time.

The heat liberated by the radiation-induced polymerization reaction brings the temperature of the system to the level required to generate free radicals from the chemical initiator. By controlling the monomer concentration of the solution and the radiation conditions, one may start from any practical temperature and reach the temperature at which the chemical initiator generates free radical at the desired rate.

The chemical, free-radical initiator employed in the process of the present invention may be any of those initiators known in the art, provided the effective temperature range of the initiator, that is, the temperature range at which the initiator has an appreciable dissociation rate constant, may be reached not long before termination of the radiation-induced polymerization. If the effective temperature range of the chemical initiator is reached too long before the irradiation is stopped, large amounts of initiator have to be added from the start of the reaction so that when the irradiation is terminated sufficient initiator will be left in the system to carry the polymerization to completion. Large amounts of chemical initiators in solution may contribute a significant number of free radicals during irradiation and may therefore result in polymers of lower molecular weight than those obtained with a smaller amount of chemical initiator. Termination of radiation before completion of the polymerization is very important in obtaining substantially linear, water-soluble, high molecular weight imidazole polymers in high yields. When the polymer concentration in the irradiated system becomes high, branching and cross-linking of the imidazole polymer occurs due to the large number of free radicals produced by the radiation on the polymer. In selecting an appropriate free-radical initiator, one is chosen which does not become effective with an appreciable rate until near the end of irradiation. The point at which irradiation of the system is terminated is selected as described below.

The chemical, free-radical initiators employed in the process of this invention are not substantially effective at temperatures below about 50° C. and have a dissociation rate constant of at least $1 \times 10^{-4}$ reciprocal seconds at 100° C. Illustrative examples of chemical, free-radical initiators meeting these two criteria include azo compounds, such as azo-bisisobutyronitriles (AZBN), for example, azo-bis(2-methyl propionitrile); 4,4'-azo-bis(4-cyanovaleric acid); 2,2'-azo-bis (2,4-dimethyl valeronitrile); and 2,2'-azo-bis(2-cyclopropyl propionitrile); 2,2'- azo-bis(2-cyclobutyl propionitrile); 2,2'-azo-bis(2,4-dimethyl valeronitrile); 1,1'-azo-bis(1-cycloheptanenitrile); 2,2'-azo-bis(methylheptylonitrile); 2,2'-azo-bis(2-cyclohexyl propionitrile); azo-bis-isobutyramidine 2HCl; phenylazo-triphenylmethane; 4-hydroxyphenyl-azo-triphenylmethane; peroxide compounds, such as benzoyl peroxide, tertiary-butyl peroxy pivalate; and acetyl peroxide; propionyl peroxide; 2-isopropionyl peroxide; butyryl peroxide; 2-methoxybenzoyl peroxide; 4-benzylidenebutyryl peroxide; methyl phtholoyl peroxide; diethyl peroxy dicarbonate; ethyl tertiary-butyl peroxalate; benzyl (tertiary-butyl peroxy)oxalate; tertiary-butyl-N-(3-tolylperoxy)carbamate; and persalt compounds, such as potassium persulfate, and one electron transfer redox catalyst. The amount of chemical, free-radical initiator used is from 100 to 12,000 ppm and preferably from 300 to 10,000 ppm. Water-soluble chemical, free-radical initiators may be added directly to the aqueous monomer solution or dissolved in a small amount of water and then added too the aqueous monomer solution. Initiators which are substantially insoluble in water may be dissolved in a small amount of an organic solvent and then dispersed in the aqueous monomer solution.

As discussed above, the process of this invention is carried out in such a way that the temperature at which the chemical, free-radical initiator is split with the desired half-life is reached at about the time the irradiation is terminating so that the smallest possible overlap of radiation-induced and chemical initiator-induced polymerization occurs. The precise point at which the radiation-induced polymerization is terminated depends somewhat on the reaction conditions employed, but, in general, it may be said that the radiation-produced polymerization is terminated prior to the formation of water-insoluble polymer. In general, the higher the molecular weight of the polymer being formed the more careful one has to be to avoid cross-linking and insolubilization of the polymer. As a guideline, the radiation-induced polymerization reaction is terminated by withdrawing the sample from the source of gamma rays before the monomer to polymer conversion has reached more than 95% and preferably when it is not more than 90%. The minimum percent conversion of monomer to polymer with radiation is the percent conversion which will bring the temperature of the system to the temperature required to dissociate the initiator at a sufficient rate to sustain the substantially complete the polymerization reaction. The reaction has been terminated at monomer to polymer conversions as low as 30%. In most cases, the radiation-induced polymerization reaction is continued until the monomer to polymer conversion is at least 50% by weight.

The radiation-induced polymerization is effected, in accordance with this invention, by subjecting an aqueous solution containing at least one ethylenically unsaturated imidazole monomer to high energy ionizing radiation. The radiation employed may be particulate or electromagnetic in nature, and includes accelerated electrons, protons, neutrons, etc., as well as X-rays and gamma rays.

The imidazole polymers of the invention may be prepared from water-soluble monomers comprising (1) from 5% to 100% by weight of at least one water-soluble imidazole monomer selected from the group consisting of 1-vinylimidazole, a salt of 1-vinylimidazole and an acid, for example, sulfuric acid and hydrochloric acid, and a quaternary salt of 1-vinylimidazole and (2) from 95% to 0% of at least one water-soluble monomer conforming to the formula

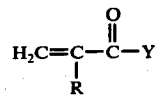

mixtures of such monomers, or water-soluble mixtures of such monomers with other ethylenically unsaturated monomers. In the formula, R represents hydrogen, methyl, or ethyl and Y represents —NH$_2$, —OM,

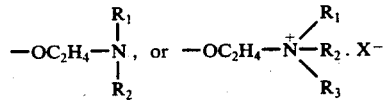

wherein M is hydrogen, H$_4$N$^+$, alkali metal, or any other cation yielding a water-soluble compound, R$_1$, R$_2$, and R$_3$ are 1 to 4 carbon alkyl radicals and X is an anion. Illustrative examples of monomers conforming to the formula include acrylamide, methacrylamide, acrylic and methacrylic acids and their water-soluble salts, such as their alkali metal salts, dimethylaminoethyl acrylate and dimethylaminoethyl methacrylate and the products of their quaternization with dimethyl sulfate, diethyl sulfate, methyl chloride and ethyl chloride. Preferred nitrogen-bearing monomers within the above formula are acrylamide, methacrylamide, dimethylaminoethyl acrylate quaternized with dimethyl sulfate or diethyl sulfate and dimethylaminoethyl methacrylate quaternized with dimethyl or diethyl sulfate. The invention also contemplates polymers obtained by polymerizing mixtures of at least one of the above-mentioned monomers with other ethylenically unsaturated monomers, for example, acrylonitrile, vinyl sulfonic acid and its alkali metal salts, and the like. The only requirements for the monomer mixture used herein are that the monomer mixture is water-soluble and that it contains at least 5% by weight, based on the total weight of monomer, of at least one of said water-soluble imidazole monomers. Acrylonitrile is, by itself, relatively insoluble in water; but mixtures thereof with the water-soluble monomers above-characterized containing up to 25% acrylonitrile are soluble and may be employed.

A particularly useful class of polymers of this invention may be prepared from water-soluble monomers comprising (1) from 50% to 90% by weight of at least one water-soluble imidazole monomer selected from the group consisting of 1-vinylimidazole, a salt of 1-vinylimidazole and an acid, for example, sulfuric acid and hydrochloric acid, and a quaternary salt of 1-vinylimidazole and (2) from 50% to 10% of at least one water-soluble monomer conforming to the formula

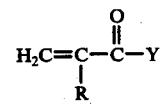

mixtures of such monomers, or water-soluble mixtures of such monomers with other ethylenically unsaturated monomers. In the formula, R represents hydrogen, methyl, or ethyl and Y represents —NH$_2$, —OM,

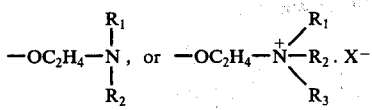

wherein M is hydrogen, $H_4N^+$, alkali metal, or any other cation yielding a water-soluble compound, $R_1$, $R_2$, and $R_3$ are 1 to 4 carbon alkyl radicals and X is an anion.

Another particularly useful class of polymers of this invention may be prepared from water-soluble monomers comprising (1) from 90% to 100% by weight of at least one water-soluble imidazole monomer selected from the group consisting of 1-vinylimidazole, a salt of 1-vinylimidazole and an acid, for example, sulfuric acid and hydrochloric acid, and a quaternary salt of 1-vinylimidazole and (2) from 10% to 0% of at least one water-soluble monomer conforming to the formula

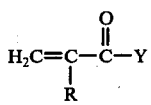

mixtures of such monomers, or water-soluble mixtures of such monomers with other ethylenically unsaturated monomers. In the formula, R represents hydrogen, methyl, or ethyl and Y represents $-NH_2$, $-OM$,

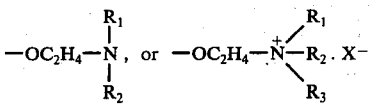

wherein M is hydrogen, $H_4N^+$, alkali metal, or any other cation yielding a water-soluble compound, $R_1$, $R_2$, and $R_3$ are 1 to 4 carbon alkyl radicals and X is an anion.

Irradiation of the monomer is carried out in an aqueous solution containing about 15% to about 90%, and preferably about 20% to about 80% by weight of dissolved monomer. At the lower concentrations of monomer, the product is generally a pourable polymer solution; at concentrations of above about 20% by weight, the product is generally a nonpourable gel. The use of monomer concentrations below about 15% tends to be uneconomical and the use of monomer concentrations much above about 90% tends to result in the formation of water-insoluble products. Of course, the particular limits of monomer concentration vary somewhat with the particular monomers used and the radiation conditions used; but, in general, values within the ranges stated are satisfactory. It has been found that provided all other variables are kept constant, the intrinsic viscosity of the polymer product increases as the monomer concentration increases.

The intensity of radiation has an effect on the molecular weight of the polymer product obtained and consequently on the instrinsic viscosity of its solutions. In general, the higher molecular weight products are obtained at the lower intensities of radiation. That is, under otherwise identical conditions, the intrinsic viscosity of the polymer tends to increase as the intensity of the radiation used decreases. On the other hand, the degree of conversion which can be obtained before an undue degree of insolubilization takes place is greater at higher intensities of radiation. In view of these considerations, it is usually desirable to employ radiation intensities of at least 10,000 rads and preferably of at least 20,000 rads per hour. While desirable high molecular weight, water-soluble polymers may be obtained with radiation intensities as high as one megarad per hour, to obtain the significantly higher molecular weight polymers of this invention, values below about 1,000,000 rads per hour are desirable; and for producing polymers having molecular weights in the highest range, it is preferred that values below about 500,000 rads per hour be employed.

The radiation dose may influence the water-solubility of the polymer, as it has been found that too high a radiation dose may render the resulting polymer water-insoluble. It has also been found that under otherwise identical conditions, the intrinsic viscosity of the polymer tends to decrease as the total dose increases. Accordingly, the total radiation dose to which the polymerization system is subjected must be carefully chosen. The particular radiation dose used will depend somewhat on the radiation intensity used, the monomer concentration, the particular monomers employed, and on the desired intrinsic viscosity of the polymer to be produced. The minimum dose should be that adequate to polymerize enough monomer so that the heat of the reaction will bring the temperature of the mixture to the temperature at which the chemical initiator splits with the required rate to continue and complete the polymerization after irradiation is terminated. Although lower dose may be used, it is generally preferred to use a dose of at least 5,000 rads. The upper limit of radiation dose is that which produces substantial amount of water-insoluble products. In general, radiation doses as high as 500,000 rads may be successfully employed. However, for most practical purposes, dosages from about 10,000 to about 300,000 rads are employed.

The variables of radiation intensity, total radiation dose, and monomer concentration discussed above are interdependent variables. While useful polymers may be prepared at all monomer concentrations, radiation intensities, and radiation dosages within the ranges given heretofore, all combinations of concentration, dose, and intensity within these ranges may not be used to prepare the water-soluble, high molecular weight polymers. In view of this interdependency of intensity, dose, and monomer concentration, it may be necessary to perform a limited amount of experimentation in order to prepare a polymer having the desired water solubility and intrinsic viscosity. However, this experimentation may be kept to a minimum in view of the disclosure in the numbered examples given hereinafter showing the preparation of a variety of polymers of different intrinsic viscosities and in view of the discussion herein of the effect of intensity, dose, and monomer concentration on the water-solubility and intrinsic viscosity of the polymer. For example, a polymer having an intrinsic viscosity of about 2.0 deciliters per gram in 2 normal sodium chloride solution at 25.5° C. may be prepared using the reaction conditions employed in Example 1 for the preparation of a polymer having an intrinsic viscosity of 1.8 dl/g, except that the intensity is decreased and/or the monomer concentration is higher.

The radiation-induced polymerization reaction may be conducted over a rather wide range. It is preferable to avoid the use of very low pH values because some production of undesirable, insoluble products tends to take place if the pH is unduly lowered, particularly with acrylamide base products. On the other hand, very high pH values may result in some hydrolysis and modification of the monomer being reacted, this again being particularly true of acrylamide. Although the particular range will depend to some degree on the particular monomer composition being treated, it may be stated in general that pH values of about 3 to 13 are satisfactory. A preferred pH range for the preparation of anionic polymers is from about 8 to about 11. A preferred pH range for the preparation of cationic polymers is from about 3 to about 8.

When the radiation-induced polymerization reaction has continued to the point where the temperature of the system is at a temperature sufficient to cause dissociation of the chemical, free-radical initiator and thereby initiate and sustain chemically induced free-radical polymerization, the radiation-induced polymerization reaction is terminated by removing the system from the influence of the high intensity radiation. Due to the fact that polymerization reactions are exothermic and that sufficient temperature has been reached to induce chemically initiated polymerization, the latter polymerization will continue until substantially all of the monomer has been converted to polymer.

The product of the process of this invention is an aqueous solution of the water-soluble polymer, which may be in the form of a pourable liquid or a nonpourable, rubbery gel, depending upon the polymer concentration and the intrinsic viscosity of the polymer. The bulk viscosity of the polymer solution tends to increase as the polymer concentration and intrinsic viscosity of the polymer increases. The polymer solutions produced, in accordance with this invention, may be admixed with water and used directly or the polymer solution may be concentrated by conventional means or it may be recovered in particulate form, for example, powder form. For example, a nonpourable gel may be finally subdivided and the water removed by conventional drying techniques or the water may be extracted from the subdivided gel with a water-miscible, volatile organic liquid which has no affinity for the copolymer, for example, methanol.

The imidazole polymers prepared by the process of this invention have an intrinsic viscosity of at least about 0.4, and preferably at least about 0.5 deciliters per gram as measured in two normal sodium chloride at 25° C. A particularly preferred class of imidazole polymers have an intrinsic viscosity of at least about 0.7 deciliters per gram as measured in two normal sodium chloride at 25° C. Although the intrinsic viscosity of the polymer will depend on the nature of the starting monomer and on the specific combination of reaction conditions used, the polymers prepared by the process of this invention usually have an intrinsic viscosity of not more than about 10 deciliters per gram as measured in two normal sodium chloride at 25° C. It will be understood, of course, that polymers having an intrinsic viscosity above about 10 deciliters per gram may be prepared if desired. Generally, under otherwise identical conditions, the intrinsic viscosity increases as the amount of imidazole in the polymer decreases. When the intrinsic viscosity of the polymer is measured in water without the presence of salt, values obtained are higher.

The invention will be better understood from a consideration of the following examples which are presented for illustrative purposes and are not to be considered as defining or limiting the scope of this invention. All parts and percentages are by weight unless otherwise specified. The intrinsic viscosities reported are measured in 2 normal sodium chloride solution at 25° C., unless otherwise stated.

EXAMPLE 1

To a 500 ml beaker 80 ml of deionized water were added. To the water 72 grams of N-ethyl-N-vinylimidazolium ethosulfate and 48 grams of acrylamide were added and the content of the beaker was stirred with magnetic stirrer until a completely clear solution resulted. The pH of the resulting solution was adjusted to 3.0. Then 0.4 gram of potassium peroxy disulfate were dissolved into the monomer solution. Subsequently the catalyst containing solution was poured into an irradiation vessel, flushed with $N_2$ gas for 20 minutes and irradiated for 26 minutes with Co gammas at the radiation intensity of 220,000 rads per hour. The polymerization raw product was a rubbery gel. A portion of the gel was extruded and an accurately weighed amount of the gel strands was added into a beaker containing approximately 5 times its weight in acetone. The strands were left inside the acetone overnight and hardened. The hard strands were ground by a Wiley Mill using a 20 mesh screen. The ground product was slurried in acetone, filtered by vacuum filtration, washed three times on the filter with fresh acetone and partially dried on the filter. The semi-dry powder was quantitatively transferred into a wide mouth jar and dried in a vacuum oven for 24 hours at 36° C. The percent solids in the vacuum dried powder were determined by drying a portion of it in a 110° C. conversion oven to constant weight. The percent monomer to polymer conversion was then evaluated from the equation:

$$\% \text{ conversion} = \frac{\text{Weight of completely dry powdered product}}{\text{Theoretical weight of polymer assuming 100\% conversion}} \times 100 = 96.3\%$$

The intrinsic viscosity of the product in two normal sodium chloride solution at 25° C. was found to be 1.8 deciliters per gram.

EXAMPLE 2

To a 250 ml beaker containing 30 grams of deionized water, 120 grams of N-ethyl-N-vinylimidazolium ethosulfate were added, followed by 1.5 grams of potassium peroxy disulfate. The content of the beaker was stirred with magnetic stirrer until a completely clear solution resulted. The pH of the solution was adjusted to 3.0 and the solution was poured into an irradiation vessel and flushed with $N_2$ gas for 20 minutes. Subsequently the irradiation vessel was closed and the sample was irradiated for 51 minutes at the radiation intensity of 220,000 rads per hour. The monomer to polymer conversion was determined as in Example 1 and was found to be 100%. The intrinsic viscosity in two normal sodium chloride solution at 25° C. equalled 0.43 deciliters per gram.

EXAMPLE 3

To a 700 ml beaker containing 200 ml of deionized water, 40 grams of N-methyl-N-vinylimidazolium methosulfate, 40 grams of 2-methacryloyloxyethyltrimethylammonium methosulfate, and 120 grams of acrylamide was added in that order. The content of the beaker was then stirred until a completely clear solution resulted. The overall monomer concentration of this solution was 50% w/w and the monomer mixture consisted of 60% acrylamide, 20% N-methyl-N-vinylimidazolium methosulfate and 20% 2-methacryloyloxyethyltrimethylammonium methosulfate. The pH of the monomer solution was adjusted to 3.0 using 3 normal sulfuric acid solution. Subsequently 8 ml of 5% w/v solution of 2,2'-azo-bis(isobutyronitrile) were added to the monomer solution and stirred well. The monomer solution then was poured into an irradiation vessel and flushed with $N_2$ gas for 20 minutes. After the monomer solution was flushed the irradiation vessel was closed and the sample was irradiated for 20 minutes with $Co^{60}$ gammas at the radiation intensity of 240,000 rads per hour. The monomer to polymer conversion was determined as in Example 1, and was found to be 100.0%. The intrinsic viscosity in two normal sodium chloride solution at 25° C. equalled 3.0 deciliters per gram.

EXAMPLE 4

170 grams of deionized water are added to a 500 ml beaker. 150 grams of acrylamide and 50 grams of 1-vinylimidazole dimethyl sulfate quaternary salt are dissolved in this water. While this solution is stirred with a magnetic stirrer, 1.2 ml of 5% solution of 2,2'-azo-bis-(isobutyronitrile) are added. Subsequently, additional deionized water is added to the solution to bring its net total weight to 400 grams. The pH of the solution is adjusted to 3.0 using $H_2SO_4$. This final monomer solution is transferred to an irradiation vessel, flushed for 20 minutes with prepurified $N_2$ and irradiated for 30 minutes at 200,000 rads per hour. The polymer solution is then removed from the influence of the gamma rays and polymerization allowed to continue until the solution has cooled to room temperature. The monomer to polymer conversion is about 76% and the polymer has an intrinsic viscosity of 5.3 deciliters per gram in two normal sodium chloride at 25° C.

EXAMPLE 5

Example 4 is repeated except that 4.8 ml of 5% weight per volume solution of 2,2'-azo-bis(isobutyronitrile) are added into the solution (600 ppm based on solution weight). The solution is also given a radiation dose of 100,000 rads at 200,000 rads per hour and then cooled to room temperature. The conversion of monomer to polymer is about 90.5%.

EXAMPLE 6

Example 4 is repeated except that 8.0 ml of 5% weight per volume solution of 2,2'-azo-bis(isobutyronitrile) are added this time into the solution (1,000 ppm based on solution weight) and the solution is given a total dose of 112,000 rads at 240,000 rads per hour. The reaction product is removed from the radiation source and the polymerization induced by the chemical initiator allowed to continue. The reaction product is allowed to stand until it has cooled to room temperature. The monomer to polymer conversion is about 97% and the polymer has an intrinsic viscosity of 5.2 deciliters per gram.

EXAMPLE 7

An aqueous solution comprising 60 parts of water and 40 parts of a mixture of monomers comprising 90 parts of acrylamide and 10 parts of 1-vinylimidazole dimethyl sulfate quaternary salt is prepared according to the procedure of Example 4. The pH of this solution is adjusted to 3.0 and 500 parts per million of 2,2'-azo-bis(2-methylpropionitrile) (AZBN) are added to the solution. The resulting solution is then irradiated for 18 minutes with gamma rays from a cobalt 60 source at an intensity of 90,000 rads per hour. The reaction product is removed from the radiation source and the polymerization induced by the presence of the 2,2'-azo-bis(2-methylpropionitrile) allowed to continue. The reaction product is allowed to stand until it has cooled to room temperature. The monomer to polymer conversion is 99.2% and the polymer has an intrinsic viscosity of 6.0 deciliters per gram.

EXAMPLE 8

An aqueous solution containing 60 parts of water and 40 parts of a monomer mixture comprising 80 parts of acrylamide and 20 parts of 1-vinylimidazole dimethyl sulfate quaternary salt according to the procedure of Example 4. The pH of the resulting solution is adjusted to 3.0 and 860 ppm of 2,2'-azo-bis(2-methylpropionitrile) are added. The solution is then placed in a polyethylene container and flushed with nitrogen for 20 minutes. The solution is then irradiated with gamma rays from a cobalt 60 source for 28.0 minutes at a radiation intensity of 240,000 rads per hour. The reaction product is then removed from the radiation source and the polymerization allowed to continue. The reaction product is allowed to stand until it has cooled to room temperature. The monomer to polymer conversion is 97.0% and the polymer has an intrinsic viscosity of 4.7 deciliters per gram.

EXAMPLE 9

An aqueous solution of 65 parts of water and 35 parts of a monomer mixture comprising 70 parts of acrylamide and 30 parts of 1-vinylimidazole diethyl sulfate quaternary salt are prepared according to the procedure of Example 1. The pH of the solution is adjusted to 3.0 and 2,000 ppm of potassium peroxy disulfate added. The solution is then added to a polyethylene container and the container flushed with nitrogen for 20 minutes. The solution is then irradiated with gamma rays from a cobalt 60 source for 15 minutes at a radiation intensity of 220,000 rads per hour. The reaction product is then moved from a radiation source and the polymerization induced by the presence of the potassium peroxide disulfate allowed to continue. The reaction product is permitted to stand until it has cooled to room temperature. The monomer to polymer conversion is 100% and the polymer has an intrinsic viscosity of 3.2 deciliters per gram as measured in two normal sodium chloride solution at 25° C.

EXAMPLE 10

An aqueous solution of 20 parts of water and 80 parts of a monomer mixture containing 25 parts of acrylamide and 75 parts of 1-vinylimidazole diethyl sulfate quaternary salt are prepared according to the procedure of Example 1. The pH of the solution is adjusted to 3.0 and 2,000 ppm of potassium peroxy disulfate added. The solution is then flushed with nitrogen and irradiated with gamma rays from a cobalt 60 source for 40 minutes at an intensity of 220,000 rads per hour. The reaction product is removed from the radiation source and the polymerization, induced by the presence of the potassium peroxy disulfate, allowed to continue. The reaction product is permitted to stand until it is cooled to room temperature. The monomer to polymer conversion is 85% and the polymer has an intrinsic viscosity of 1.0 as measured in two normal sodium chloride at 25° C.

EXAMPLE 11

An aqueous solution of 40 parts water and 60 parts of a mixture of 25 parts acrylamide and 75 parts of 1-vinylimidazole diethyl sulfate quaternary salt are prepared according to the procedure of Example 1. The pH of this solution is adjusted to 3 and 7,500 ppm of potassium peroxy disulfate are added thereto. The solution is then added to a polyethylene container which is flushed with nitrogen for 20 minutes. The solution is then irradiated with gamma rays from a cobalt 60 source for 30 minutes at an intensity of 220,000 rads per hour. The reaction product is removed from the irradiation source and the polymerization induced by the presence of the potassium peroxy disulfate allowed to continue. The reaction product is allowed to stand until it has cooled to room temperature. The monomer to polymer conversion is 100%. The polymer has an intrinsic viscosity of 0.9 deciliters per gram in two normal sodium chloride solution at 25° C.

EXAMPLE 12

To a 2 gallon container 7 pounds of deionized water, 1,290 grams of acrylamide and 68 grams of N-methyl-N-vinylimidazolium methosulfate are added in that order and stirred to a homogeneous solution. The pH of the solution is then adjusted to 3.0 using 10 normal sulfuric acid solution. To the pH 3.0 solution 46 ml of 5 percent w/v solution of 2,2'-azo-bis(2-methylpropionitrile) in methanol are added and the solution is stirred well. The monomer solution is then added into an irradiation vessel, flushed for about 30 minutes with prepurified $N_2$ and irradiated with cobalt 60 gammas for 16 minutes at the dose rate of 90,000 rads per hour. After removal from the radiation field the sample is allowed to cool to room temperature. Monomer to polymer conversion is about 100.0% and the polymer has an intrinsic viscosity of about 8 deciliters per gram in 2 normal sodium chloride at 25° C.

The water-soluble, high molecular weight imidazole polymers prepared by the process of this invention may be employed in any process where water-soluble, high molecular weight imidazole polymers are presently used. Due to their higher molecular weight, the imidazole polymers of this invention are superior to the imidazole polymers known heretofore. The imidazole polymers of this invention are particularly suitable for use as flocculating agents, viscosity control agents, municipal sewage treatment agents, sludge dewatering agents, dye mordants and optical brighteners for use in color photography, complexing and chelating agents, and clarifying agents.

Although the process of this invention has been described with reference to specific reaction conditions and reactants, it will be apparent that still other different and equivalent reactants and process conditions may be substituted for those specifically described, all within the spirit and scope of this invention.

Having described the invention, what is desired to be secured by Letters Patent is:

1. A process of preparing water-soluble, high molecular weight imidazole polymers which comprises
   irradiating an aqueous solution comprising from 15% to about 90% by weight of monomer comprising from 5% to 100% by weight of at least one water-soluble imidazole monomer selected from the group consisting of 1-vinylimidazole, acid salt of 1-vinylimidazole, and quaternary salt of 1-vinylimidazole and from 95% to 0% by weight of at least one water-soluble monomer conforming to the formula

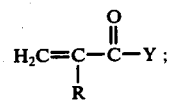

wherein R is hydrogen, methyl, or ethyl and Y is $-NH_2$, $-OM$,

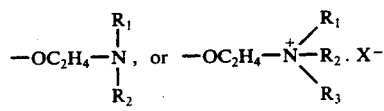

wherein M is a cation, $R_1$, $R_2$ and $R_3$ are 1 to 4 carbon alkyl groups, and X is an anion, and
   from about 100 to about 12,000 ppm of a chemical, free-radical initiator for the polymerization of ethylenically unsaturated compounds,
   said initiator having a dissociation rate constant above about $1 \times 10^{-4}$ reciprocal seconds at 100° C., does not substantially catalyze the polymerization of ethylenically unsaturated monomers at temperatures below about 50° C., and does substantially catalyze the polymerization of ethylenically unsaturated monomers at temperatures below about 100° C.,
   with high energy ionizing radiation at an intensity of from about 10,000 rads to about 1,000,000 rads per hour to a dose of from about 5,000 to about 500,000 rads,
   to form a reaction mass in which from about 30% to about 95% by weight of the monomer initially present in aqueous solution has been converted to water-soluble polymer and in which chemically induced polymerization occurs,
   terminating the high energy ionizing radiation of the reaction mass before formation of water-insoluble polymer in the reaction mass, and allowing the chemically induced polymerization of the reaction mass to continue.

2. A process of claim 1 wherein the radiation intensity is from about 20,000 to about 500,000 rads per hour and the radiation dose is from about 10,000 to about 300,000 rads.

3. A process of claim 1 wherein the monomer concentration is from 20% to 80% by weight, based on the total weight of monomer and the initial concentration is from 300 to 10,000 ppm.

4. A process of claim 1 wherein the monomer is 100% by weight of a water-soluble imidazole monomer selected from the group consisting of 1-vinylimidazole, acid salt of 1-vinylimidazole, and quaternary salt of 1-vinylimidazole.

5. A process of claim 1 wherein the monomer is a mixture of an imidazole monomer and acrylamide.

6. A process of claim 1 wherein the chemical, free-radical initiator is 2,2'-azo-bis(2-methyl propionitrile).

7. A process of claim 1 wherein the chemical, free-radical initiator is 4,4'-azo-bis(4-cyanovaleric acid).

8. A process of claim 1 wherein the chemical, free-radical initiator is potassium peroxy disulfate.

9. A process of claim 1 wherein the monomer comprises at least 15% by weight of the imidazole monomer.

10. A process of claim 1 wherein the irradiation is terminated before 90% of the monomer is converted to polymer.

11. A process of claim 1 wherein the imidazole polymer formed has an intrinsic viscosity of from about 0.4 to about 7 deciliters per gram in two normal sodium chloride solution.

* * * * *